(No Model.)  3 Sheets—Sheet 1.

C. W. BRIDEGUM.
DUMPING CAR.

No. 544,561. Patented Aug. 13, 1895.

Witnesses:
F. D. Goodwin
Will. H. Baw.

Inventor:
Cyrus W. Bridegum
by his Attorneys
Howsom & Howsom (No Model.) 3 Sheets—Sheet 2.

C. W. BRIDEGUM.
DUMPING CAR.

No. 544,561. Patented Aug. 13, 1895.

Witnesses:
F. D. Goodwin
Will A. Barr

Inventor:
Cyrus W. Bridegum
by his Attorneys
Howson & Howson (No Model.)

C. W. BRIDEGUM.
DUMPING CAR.

No. 544,561. Patented Aug. 13, 1895.

Witnesses:
F. D. Goodwin
Will A. Barr

Inventor:
Cyrus W. Bridegum
by his Attorneys
Howson & Howson

UNITED STATES PATENT OFFICE.

CYRUS W. BRIDEGUM, OF HAINSPORT, NEW JERSEY.

DUMPING-CAR.

SPECIFICATION forming part of Letters Patent No. 544,561, dated August 13, 1895.

Application filed October 23, 1894. Serial No. 526,675. (No model.)

*To all whom it may concern:*

Be it known that I, CYRUS W. BRIDEGUM, a citizen of the United States, and a resident of Hainsport, Burlington county, New Jersey, have invented certain Improvements in Dumping-Cars, of which the following is a specification.

The object of my invention is to so construct a dumping-car that one side or end, forming a movable section, will be automatically raised in such a manner as to be entirely clear of the load, and to so make the connections that the side or end can be lifted without dumping the car.

My invention also relates to a special construction of the truck.

Figure 1:
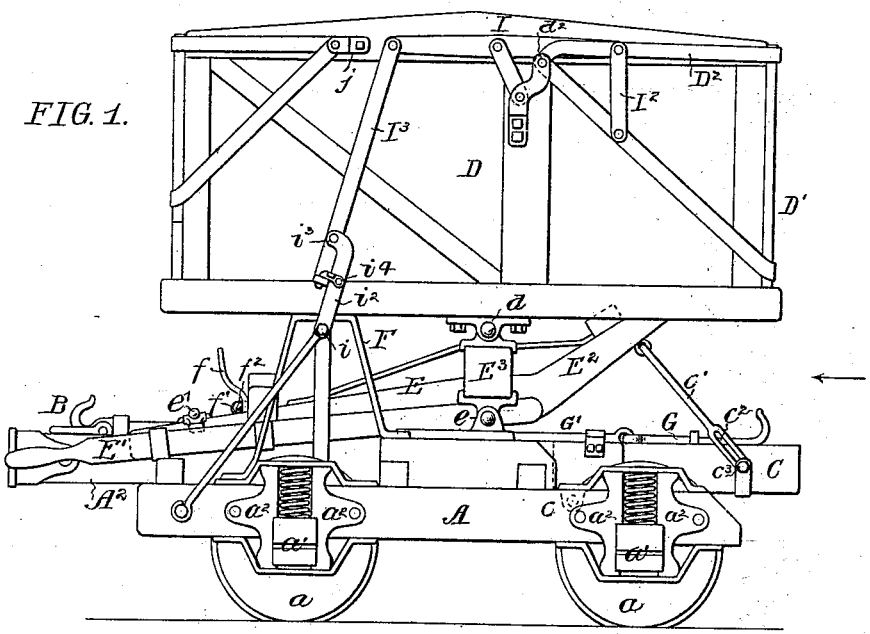
Figure 2:
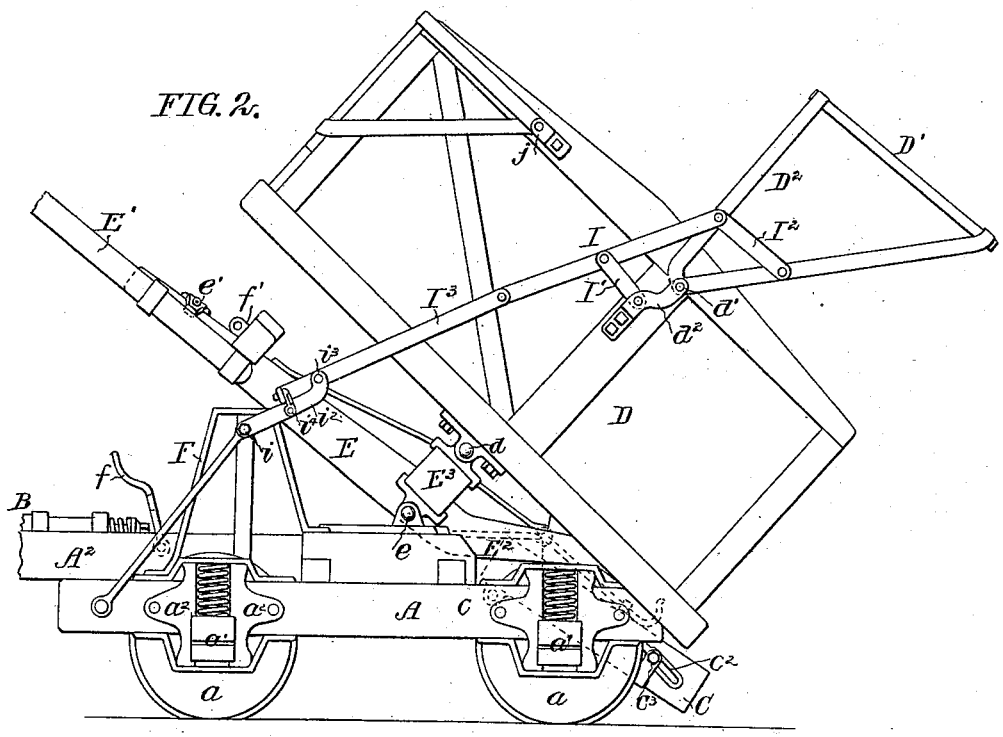
Figure 3:
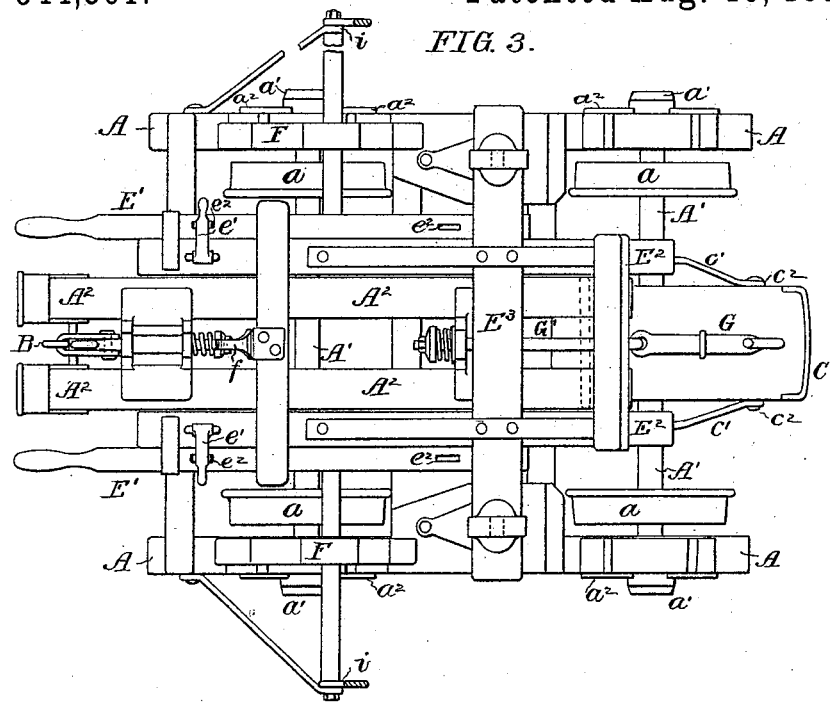
Figure 4:
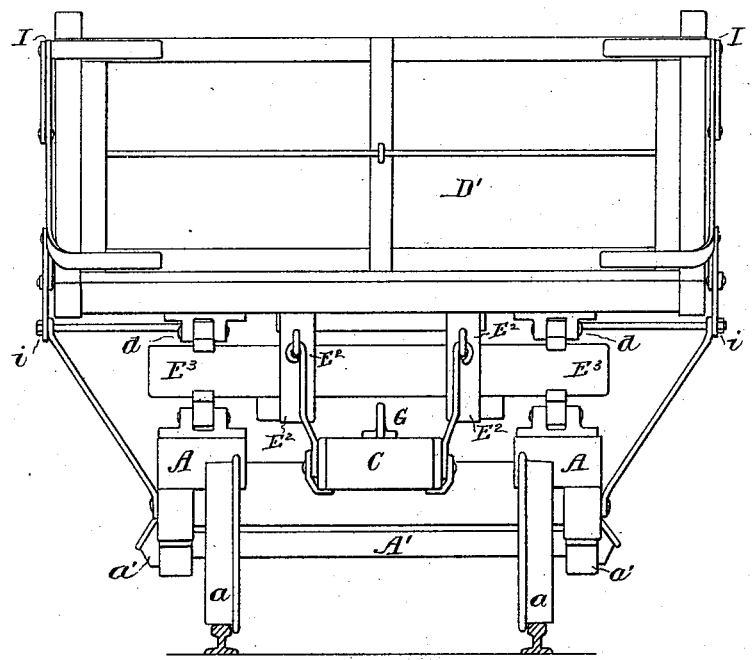
Figure 5:
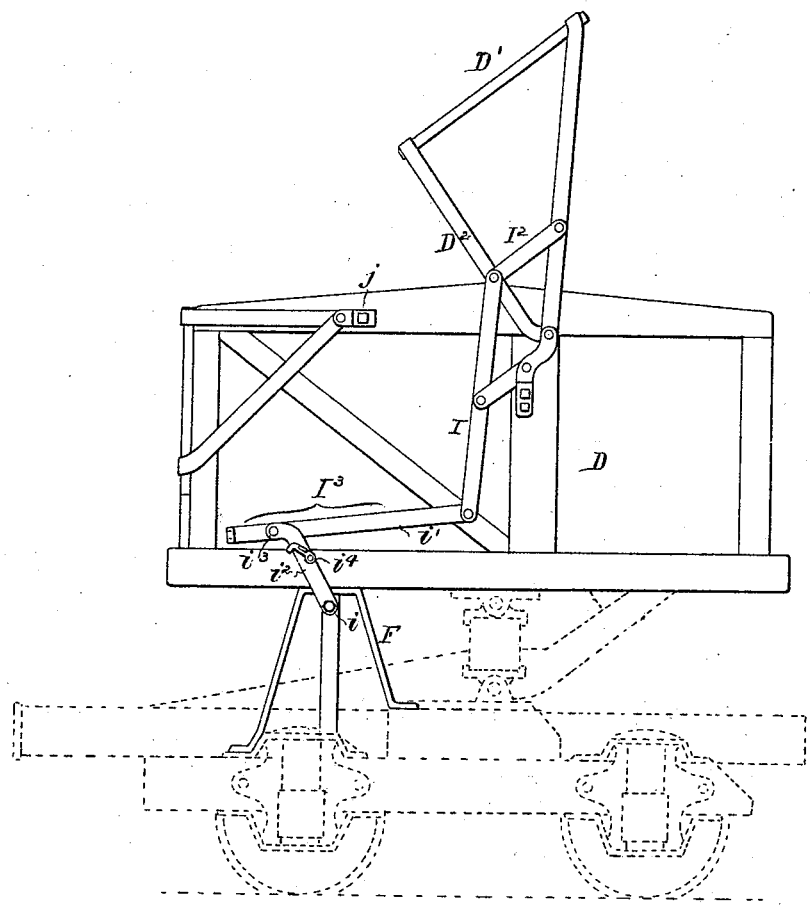

In the accompanying drawings, Figure 1 is a view of an end-dumping car illustrating my invention. Fig. 2 is a view showing the car-body tilted. Fig. 3 is a plan view of the truck, the body of the car being removed. Fig. 4 is an end view looking in the direction of the arrow, Fig. 1. Fig. 5 is a side view showing one end raised without tilting the truck.

It will be understood that the mechanism for automatically operating the end-board of the body of the car can be used in a side-dumping car as well as an end-dumping car without departing from my invention.

Referring to the drawings, A is the truck, and $a\ a$ are the wheels mounted on the axles $A'$, which are adapted to boxes $a'$ mounted in the bolsters $a^2$, set low in the frame of the truck, so that the body of the car will be as near the truck as possible. At one end of the truck A are fixed bumpers $A^2$, provided with a suitable coupling B, and at the opposite end of the truck is a pivoted bumper C, hung to the truck so that it will be lowered, as shown in Fig. 2, when the body of the car is tilted.

E is a tilting frame mounted on pivots $e$ and held in position by the pivoted latch $f$. This latch passes over a keeper $f'$ on the tilting frame E, and a pin $f^2$ passes through the keeper in front of the latch to keep it in place, as shown in Fig. 1.

At each side of the frame E are handles $E'$, which can be drawn out, as shown in Fig. 2, so that a greater leverage can be exerted to dump the car. These handles $E'$ are held in place by pivot-latches $e'$, as shown in Figs. 1 and 3, having tongues which enter slots $e^2$ in the handles, locking the handles in either of the two positions.

The tilting frame E has an extension $E^2$, which supports one end of the body D of the car, the other end of the body being supported by a bearing-frame F, mounted on each side of the truck, as clearly shown in the drawings. The body of the car being pivoted to the said tilting frame E at $d$, it will thus be seen that when the tilting frame is locked to the truck, as shown in Fig. 1, the body D of the car is rigidly held in position, but by simply releasing the latch $f$ the body can be readily tilted. The tilting frame is suitably stayed, and the pivot-sections are mounted on a heavy cross-bar $E^3$.

As before remarked, the bumper C is pivoted at $c$ to the truck-frame, and is connected to the tilting frame E by a link or links $c'$. In the present instance the links are arranged one at each side of the bumper. Each link has a slot $c^2$, to which is adapted a pin $c^3$, so that when the car is dumped the bumper C will be lowered, allowing the body of the car to tilt. By this arrangement I am enabled to mount the pivoted body low on the truck.

G is a coupling-head carried by the bumper C and loosely coupled to the spring draw-bar $G'$. This coupling-head is so connected to the bumper that it will move with it, yet when the car is coupled in train it will act the same as an ordinary coupling-head.

The end section $D'$ of the car-body is pivoted so that it will be raised automatically sufficiently above the car-body, as shown in Fig. 2, as to allow the contents of the car to be discharged without interference. Secured to each side of the end-board $D'$ is a triangular arm $D^2$, pivoted at $d'$ to a bracket $d^2$ on the body of the car. I is a lever connected to said bracket by a link $I'$, to the triangular frame $D^2$ by a link $I^2$ some distance from the pivot-point $d'$, and this lever in turn is connected to a bar $I^3$, pivoted at $i$ to the standard or frame F. The pivot-points are arranged in such a manner that when the car is tilted the end section $D'$ will be raised, as indicated in Fig. 2, and when the car-body assumes its normal position the end section will be lowered into place.

In order to elevate the end-board without dumping the car, so that the car may be loaded, I make the bar I³ in two sections $i'$ $i^2$, pivoted together at $i^3$, and I hang a latch $i^4$ to one section, so that it may enter an opening in the other section and thus lock the two together when the end-board is to be raised automatically on the dumping of the car, and when it is to be raised without dumping the car the latch is simply thrown back, so as to make the sections independent, thus allowing the end-board to be lifted, as shown in Fig. 5. This construction may be used on the side-dumping car, as before remarked, as well as on an end-dumping car. The opposite end of the car I also pivot at $j$, so that it can be thrown back onto the body of the car, and thus the car can be loaded from either end.

I claim as my invention—

1. The combination in a dumping car, of the truck, the car body pivoted thereto and having a movable section with arms pivoted to the car body, a lever I, a link pivoted to the car body and carrying the lever, one end of said lever being connected to the movable section, and an arm secured to the opposite end of the lever and to the truck, substantially as described.

2. The combination in a dumping car, of the truck, a pivoted tilting frame, means for locking the frame in position, a car body pivoted to the tilting frame and having a movable section with arms pivoted to the car body, an extension E² of the frame supporting one end of the car body, a bracket F on the truck supporting the other end of the car body, a link pivoted to the car body, a lever carried by said link, one arm of the said lever being connected to the pivoted section of the car body, and the other arm being connected to the bracket on the truck so that as the car body is tilted by the frame the pivoted section of the same will be elevated, substantially as described.

3. The combination of the truck, the car body pivoted thereto, and having a movable section pivoted to the car body, a pivoted lever attached at one end to the pivoted section of the car body, a bar $i'$ attached to the other arm of the lever, a bar $i^2$ pivoted to the bar $i'$ and to an extension on the truck, and a latch $i^4$ on one bar adapted to engage with the other bar to lock the two together and form a single connection so that the pivoted section of the car body may be automatically raised on the dumping of the car, substantially as described.

4. The combination of the truck, the tilting frame E, the tilting car body pivoted to the frame, with a pivoted bumper so connected that when the body is dumped the bumper will be lowered, substantially as described.

5. The combination of the truck, the tilting frame pivoted to said truck, a catch for securing said frame to the truck, the tilting car body, and a pivoted bumper, with a pivoted end for the car body connected to the truck, substantially as described.

In testimony whereof I have signed my name to this specification in the presence of two subscribing witnesses.

CYRUS W. BRIDEGUM.

Witnesses:
WILL. A. BARR,
JOSEPH H. KLEIN.